Nov. 24, 1959 — F. J. LINDHOLM — 2,914,100
CONTROL SYSTEM FOR BAND SAW BLADE
Filed Nov. 21, 1956 — 5 Sheets-Sheet 1
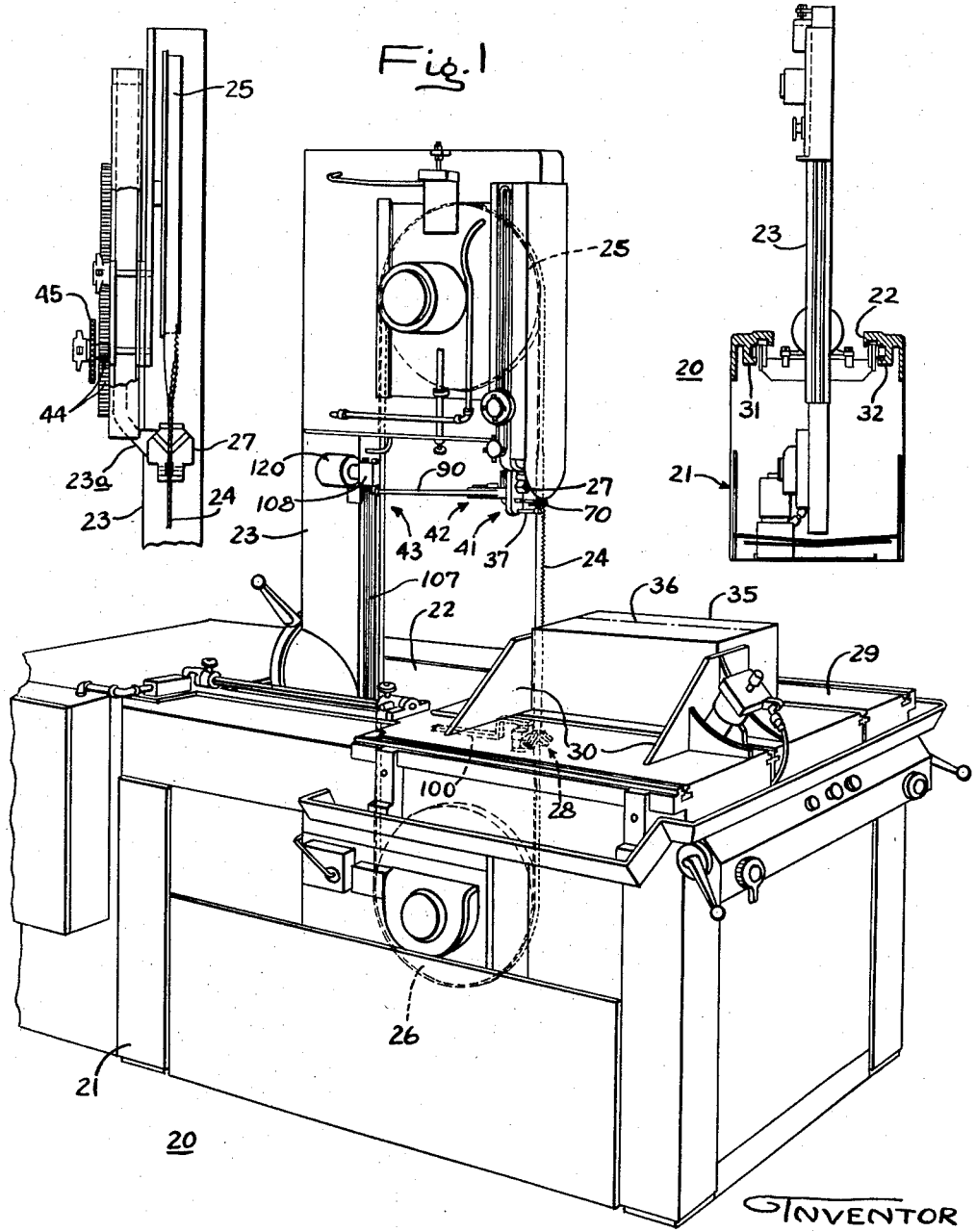
INVENTOR
FRANK J. LINDHOLM
by: Carlson, Pitzner, Hubbard & Wolf
ATTYS.

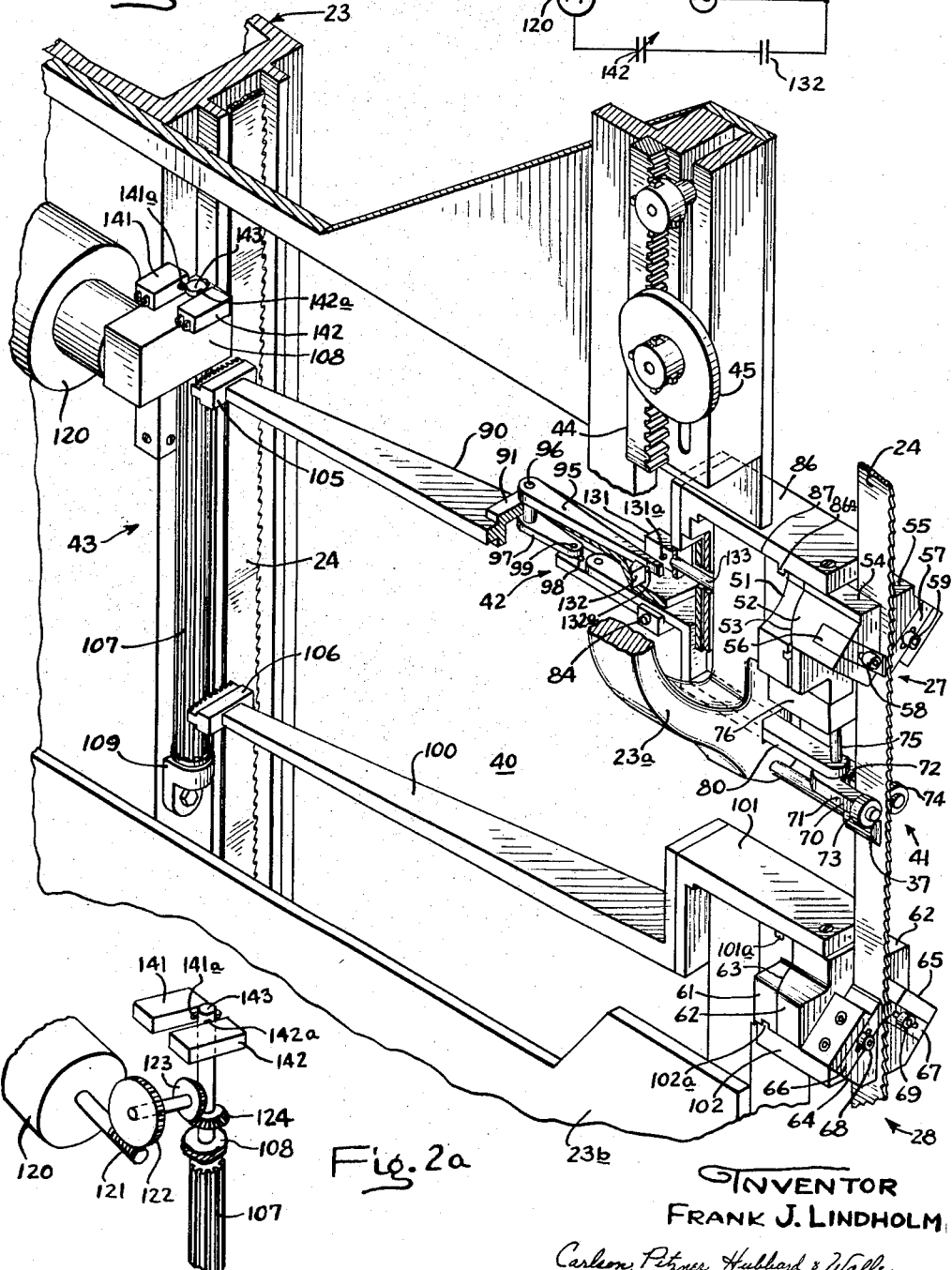

Nov. 24, 1959     F. J. LINDHOLM     2,914,100
CONTROL SYSTEM FOR BAND SAW BLADE
Filed Nov. 21, 1956     5 Sheets-Sheet 3
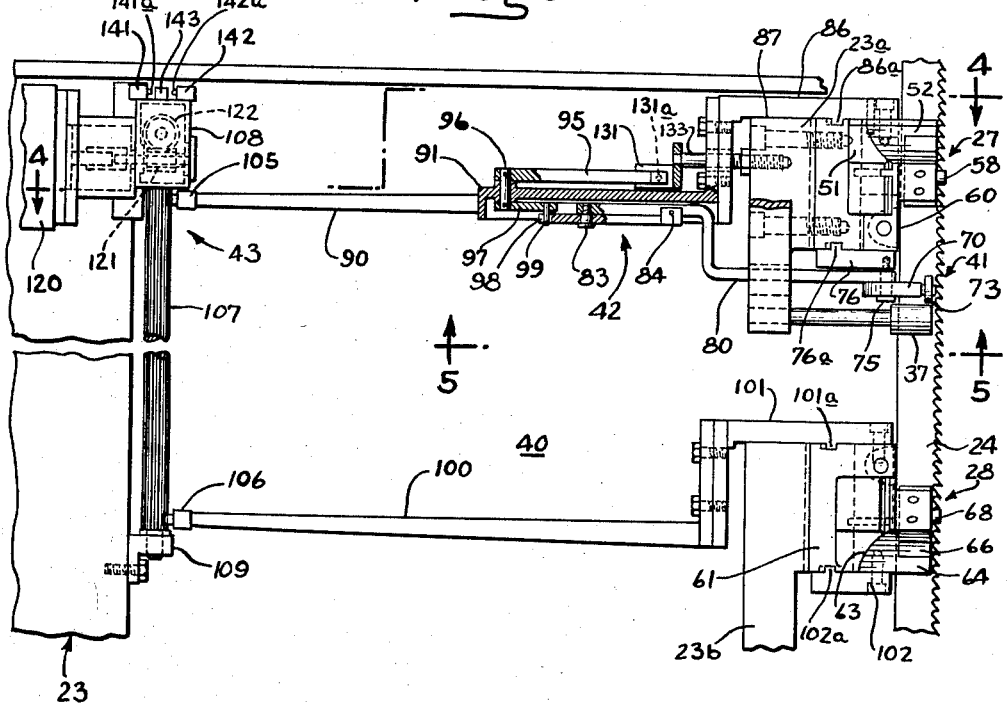
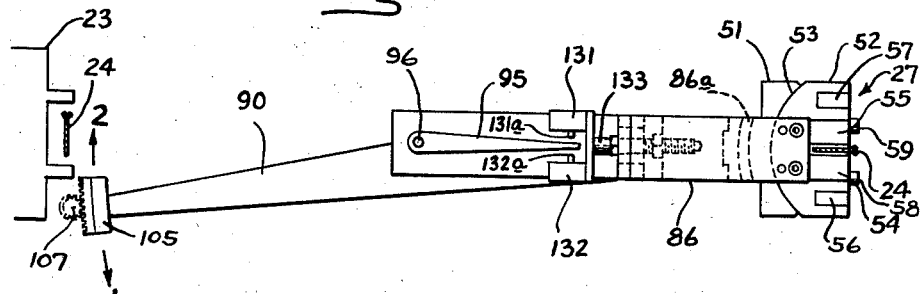
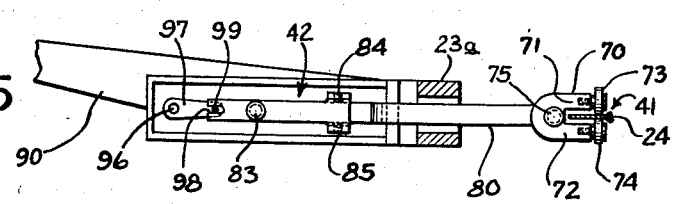
INVENTOR
FRANK J. LINDHOLM
by: Carlson, Pitner, Hubbard & Wolfe
ATTYS.

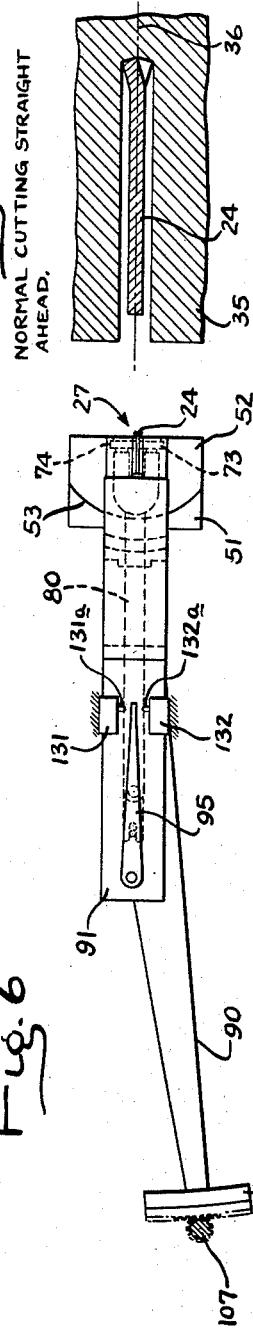

Nov. 24, 1959     F. J. LINDHOLM     2,914,100
CONTROL SYSTEM FOR BAND SAW BLADE
Filed Nov. 21, 1956     5 Sheets-Sheet 5
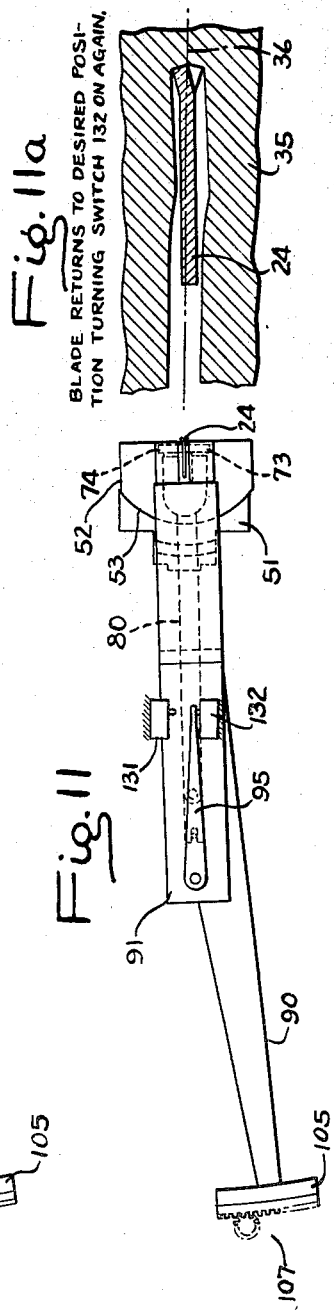
INVENTOR
FRANK J. LINDHOLM
by: Carlson, Pitzner, Hubbard & Wolfe
ATTYS.

United States Patent Office 2,914,100
Patented Nov. 24, 1959

2,914,100

CONTROL SYSTEM FOR BAND SAW BLADE

Frank J. Lindholm, Park Ridge, Ill., assignor to Armstrong-Blum Manufacturing Company, Chicago, Ill., a corporation of Illinois Application November 21, 1956, Serial No. 623,605

10 Claims. (Cl. 143—160)

The present invention relates to bandsaws and more particularly to means for automatically steering a band saw blade through a workpiece.

It is an object of the invention to provide a band saw capable of making a more accurate cut than band saws conventionally used. It is an object to provide a band saw which overcomes the tendency of a band saw blade to drift progressively in one direction or the other from the desired line of cut. More specifically, it is an object to provide a band saw having novel provision for detecting lateral departure of the blade from the desired line of cut and for imparting corrective twist to the blade for causing the same to steer back to the desired path.

It is a further object of the invention to provide a band saw which is capable of making an accurate cut through workpieces even with blades having unbalanced wear or with new blades having unbalanced cutting characteristics and which would normally cause excessive run-off in the direction of the sharper edge. It is a related object to provide a band saw which, by automatic correction for unbalanced wear, extends useful blade life. It is also an object to provide a band saw in which any tendency of the blade to cut to one side or the other is detected and corrected promptly, thereby obviating the progressive run-off responsible for breakage, particularly in cutting workpieces of large cross section. Because of the elimination of a common cause of breakage of the band saw blade, the present invention results in a band saw which is safer to use than conventional saws.

It is still another object to provide a detector which is sensitive to small amounts of departure on the order of a few thousandths of an inch but which nevertheless is capable, through a novel multiplying arrangement to produce the necessary corrective action without imposing any undue reaction pressure upon the blade. It is a more specific object to provide a detector arrangement which is sensitive to lateral deviation of the blade at the cutting edge and which is not affected by the blade angle or by the twist which is imparted to the blade by the responsive mechanism in directing the blade back to the desired line of cut.

It is an object to the invention in one of its aspects to provide an automatic control arrangement for correctively steering a band saw blade in which the degree of twist imparted to the blade is proportioned to the departure of the blade from the desired line of cut. It is a related object to provide an automatic control arrangement of the above type which is of simple construction yet free of objectionable hunting about the control point.

It is another object of the invention to provide, in a device of the above type, a power operated servo acting upon the regular blade guides for imparting corrective twist. It is a more specific object to provide an automatic steering mechanism for a band saw blade which employs a single conveniently arranged detector for detecting lateral departure but which provides a corrective twisting through simultaneously actuated blade guides located, in a vertical type saw, both above and below the workpiece. Generally stated, it is an object to provide means for correcting the direction of travel of a band saw blade which acts uniformly over the entire length of the kerf and which thereby provides a line of cut which is accurate vertically as well as horizontally in large size workpieces.

It is still a further object of the invention to provide means for corrective automatic steering of a band saw blade which does not limit the normal operation or capacity of the machine, which is well suited for use under shop conditions by relatively untrained machine operators, which is not affected by rough usage, and which therefore operates reliably and without maintenance over long periods of time.

It is moreover an object of the invention to provide an automatic corrective steering arrangement which is not only applicable to metal cutting saws but which is applicable to wood cutting band saws of the type employed in lumber mills, furniture factories, and the like.

Finally it is an object of the invention to provide means for automatic steering of a band saw blade which is simple and inexpensive and which may be applied both to new machines as well as machines already in the field with minimum modification of existing parts and at an expense which is disproportionately small when compared to the result which is achieved.

Other objects and advantages of the invention will become apparent upon reading the attached detailed description and upon reference to the drawings in which:

Figure 1 is a perspective of a band saw which includes the present invention.

Fig. 1a is a transverse vertical section of the saw of Fig. 1 showing the ways on which the carriage is guided for forward feeding movement.

Fig. 1b is a fragmentary view showing the means for supporting and adjusting the upper blade guide.

Fig. 2 is a perspective view, partially diagrammatic, of the control portions of the device shown in Fig. 1.

Fig. 2a is a fragment showing the motor driving train.

Fig. 3 is a fragmentary side view of the control portions of the device.

Fig. 4 is a section taken along the line 4—4 in Fig. 3.

Fig. 5 is a view of the detector viewed along the line 5—5 in Fig. 3.

Figs. 6–11 inclusive are diagrammatic stop motion views of a typical operating cycle of the control mechanism.

Figs. 6a–11a inclusive are enlarged views of the blade in the kerf, corresponding to the conditions of the control mechanism set forth in Figs. 6–11 inclusive.

Fig. 12 (Sheet 2) is a wiring diagram showing the connections between the motor and control switch.

While the invention has been described in connection with the present embodiment, it will become apparent as the discussion proceeds that the invention is not limited to the single embodiment shown but includes various equivalents and alternative constructions falling within the spirit and scope of the appended claims.

Turning now to Fig. 1 there is shown a typical band saw of the moving carriage type intended for cutting metal of large cross section and having particular utility in steel warehouses and machine shops. For the details of construction and operation of the basic band saw construction reference to made to the copending application Ser. No. 653,355, filed April 17, 1957. For present purposes it will suffice to say that the band saw, indicated at 20, includes a base 21 having a central opening 22 and mounting a band saw carriage having a carriage frame 23. The latter carries an endless blade 24 mounted on upper and lower wheels 25, 26 in the frame. The blade is twisted at right angles by passing it through upper and lower blade guides indicated at 27, 28 so that it cuts forwardly through a workpiece held on a worktable 29 by adjustable jaws 30.

To provide feeding and return movement of the carriage, the same is supported on ways 31, 32 (Fig. 1a) and an automatic feeding means (not shown) is preferably used for advancing the carriage forwardly into the workpiece at a rate which may be controlled automatically in accordance with the resistance offered to the forward movement. In use, a workpiece which may, for example, be a block of steel 35 of large cross section, is clamped between the jaws 30, the carriage being retracted as shown in Fig. 1. With the blade driven at a desired cutting speed, the carriage advances the blade forwardly, the desired line of cut being indicated at 36. Coolant is supplied through a coolant nozzle 37.

In accordance with the present invention means are provided for detecting departure of the band saw blade from a reference position defining a desired line of cut and for producing corrective twisting of the blade, within its kerf, in order to steer the blade back to the desired line of cut, with constant correction taking place to produce a degree of accuracy not previously attainable in a machine of this type. As will be apparent as the discussion proceeds, the control provided prevents the run-off or drift characteristic of a conventional band saw and which is cumulative and thus particularly objectionable when cutting workpieces of large cross section. In the present embodiment the above is accomplished by means of a control mechanism 40 having a detector 41, an amplifying and switch controlling linkage 42 and a servo 43 which acts to apply corrective twist to the blade guides 27, 28.

Prior to discussing the automatic control features of the device, more detailed reference may be made to the construction and mounting of the blade guides 27, 28. Referring first to the blade guide 27, the same is mounted on a bracket 23a which is secured to the frame 23 of the band saw carriage and vertically adjustable thereon by means of a rack and pinion arrangement 44 operated by a hand wheel 45. (Fig. 1b.) Rigidly secured to the front portion of the bracket 23a is a concaved guide block support 51 (Figs. 2 and 4) which mounts a mating guide block 52. The mating surface indicated at 53 is cylindrical, the axis of the cylinder coinciding with the teeth on the blade 24 for reasons which will be brought out more fully below. The guide block 52 is centrally grooved to define two forward projecting portions 54, 55 straddling the blade 24. Such portions are slotted for receiving guide strips or inserts 56, 57 which are clamped in place by set screws 58, 59 which also serve to permit adjustment of clearance. The inserts 56, 57 preferably bear upon the blade over a substantial area, i.e., with only the teeth exposed, and with clearance being adjusted so that the blade is positively positioned yet free to pass without excessive friction and at speeds up to 250 feet per minute or greater. Wear at this point is avoided by facing the inserts with tungsten carbide or the like. Rearward movement of the blade due to the reaction of the workpiece is taken up by a pivoted wear block 60, the construction and mounting of which is more fully described in copending application Ser. No. 632,473, filed January 4, 1957.

Turning next to the lower blade guide 28, a corresponding structure is provided. Briefly stated, the carriage frame mounts a bracket 23b which supports a guide block support 61 having an adjustable guide block 62, the two members mating along a curved surface 63 which is coaxial with, and forms an extension of, the cylindrical surface 53 referred to above. The guide block 62 has forward extensions 64, 65 which straddle the blade and which mount inserts 66, 67, the latter being adjusted and held in place by means of set screws 68, 69.

In accordance with the invention the detector 41 is located adjacent the workpiece and between the spaced blade guides and so arranged as to respond to the lateral movement of the blade adjacent the teeth while being substantially non-responsive to the twisting of the blade. In the present instance the detector is in the form of a detector head 70 of U shape having two forwardly extending fingers 71, 72 which straddle the blade and which carry relatively narrow rollers 73, 74 at their forward ends. The head 70 is mounted for limiting rocking motion in a horizontal plane, being pivoted rearwardly of the blade at a pivot 75 which is mounted in a retaining block 76 secured to the lower end of the guide block 52. Desirably, the faces of the rollers which abut the blade 24 may be convexed to provide narrow line contact just rearwardly of the blade teeth. It will be apparent that only lateral movement is detected, sufficient clearance being provided in the head so that it remains unaffected by twisting movement.

For amplifying the motion of the detector head 70, an amplifying arm 80 (Figs. 2 and 5) is secured to the head, extending rearwardly from the pivot 75. To enable limited angular adjustment between them for the purpose of seting the null or normal position of the detector head 70, the arm 80 is made in two portions pivoted together at 83, and secured to one another by setscrews 84, 85. It will be apparent that by backing off on one of the screws and screwing down on the other, the members may be precisely adjusted relative to one another.

In accordance with one of the aspects of the invention, means are provided for coupling together the detector and corrector (servo) portions of the device for the purpose of providing a proportioned follow-up action. It will be helpful, first, to have in mind the structural elements which serve to adjust the guide block 52. Referring to Figs. 2 and 3, it will be noted that the guide block 52 is rigidly secured to a positioning block 86 which rests upon the flat upper surface 87 of the bracket 23a. The positioning block 86, in addition to positioning the guide block, serves to retain the guide block 52 snugly in place against the guide block support 51. For this purpose, a circular key 86a is provided on the underside of the block 86 mating with a circular keyway machined in the bracket 23a. A corresponding key 76a is provided on the upper surface of the retaining block 76, such key being received in a keyway machined on the under side of the bracket. Both of keys 76a, 86a are concentric with the mating surface 53 previously referred to so that the block 86 may be rotated freely in one direction or the other about the teeth of the blade as a center.

Because of the relatively large amount of contact area between the moving members and the bracket 23a and because of the compact, durable construction of the guide block, firm support and accurate positioning of the blade is assured in spite of the loading imposed by the 90° twist referred to above.

In the case of the upper guide block, adjustment is achieved and maintained by a rearwardly extending corrector arm 90 which has an enlarged portion 91 at its forward end which is rigidly secured to the positioning block 86 which, in turn, positions the guide block 52. The portion 91 also serves as a mounting for the final portion of the detector linkage. Thus, pivotally secured to the top of the arm 90 is a switch controlling arm 95 which is pivoted at its rear end on a shaft 96. Secured to the lower end of the shaft is an arm 97 engaging the end of the lever 80 leading from the detector head. Because of the spacing between the pivot points of the two levers 97, 80, a pin and slot connection is provided between them the pin 99 engaging a slot 98 formed in the end of the lever 80. It will be apparent from the drawings that lateral movement of the blade causes lateral movement of the head 70 which is multiplied through the levers 80, 95 to produce greatly amplied movement at the forward end of the lever 95. It is this amplified movement, approximately 30 times the blade movement, which is utilized to initiate the corrective twisting of the blade back toward the desired line of cut.

Prior to discussing the servo means used for rotating the blade guides, attention may be given to the corrector arm 100 associated with the lower guide block 62. At its forward end the arm 100 is rigidly secured to a positioning block 101 which in turn is bolted to the guide block 62. A circular key 101a machined on the under side of the block 101 engages a correspondingly shaped keyway machined in the upper face of the bracket 23b. The lower end of the guide block 62 is retained by retainer block 102 which is bolted thereto and which has a circular key 102a concentric with the key 101a. Thus the entire assembly consisting of the arm 100 and the blocks 101, 102 together with the guide block 62, rotates as a unit, with sliding taking place at the cylindrical surface 63 about the blade teeth as a center.

For adjusting the guide blocks 52, 62 in step with one another, means are provided at the rear end of the respective arms 90, 100 for rocking them simultaneously through a small angle. In the present instance this is accomplished by providing rack segments 105, 106 at the ends of the arms meshing with a common elongated pinion 107 which is arranged vertically, parallel to the blade, and journaled in bearings 108, 109. To turn the pinion 107, a motor 120 is used together with reduction gearing for stepping down the speed. In the present instance the reduction is brought about by a worm 121 on the motor shaft which engages a worm wheel 122. The shaft of the worm wheel is coupled to the pinion by means of pair of bevel gears 123, 124. In a practical case, a reduction on the order of 4000:1 may be used because of the relatively limited movement of the rack between its extreme positions. It will be apparent that the elongated pinion enables the bracket 23a and all of the mechanism associated with the upper blade guide and detector unit to be adjusted vertically depending upon the size of the workpiece. The motor is preferably of the three-wire reversible type well known in the art and may be a torque motor having a relatively high starting torque.

For the purpose of energizing the motor in one direction or the other in response to departure of the detector head from a normal reference position, switches 131, 132 are mounted on opposite sides of the switch controlling arm 95 with plungers 131a, 132a arranged in the path of movement of the arm. These switches are stationarily mounted with respect to the frame 23 of the carriage; in the present instance the switches are mounted on supports 133, 134 respectively, secured to the bracket 23a. The switches are preferably of the type requiring only light operating pressures on the order of 10 grams or less in order to minimize the loading effect on the blade.

In accordance with one of the more detailed features of the invention, means are further provided for limiting the maximum angle of blade twist to an amount which is just slightly greater than the normal freedom of a band saw blade within its kerf. A conventional blade has sufficient set to provide a clearance of about 0.015 inch on each side, a one inch blade being free to twist within its kerf through an angle of about 1½° in each direction. Consequently, means are provided for limiting the angle of rotation of the control arms 90, 100 to an angle on the order of plus or minus 2° from a central position. While positive stops may be used for limiting the movement, we prefer to secure such limitation by use of limit switches because of the high degree of torque multiplication occurring in the speed reduction gearing. The limit switches indicated at 141, 142 are preferably operated directly from the shaft of the pinion 107 since, by proper choice of diameter, the pinion need rotate only through half a revolution to cover the entire range of correction. Thus we provide a cam 143 at the top of the pinion which has a rise for engaging the plungers 141a, 142a respectively of the limit switches.

The manner in which the switches 131, 132 and 141, 142 are wired for control of the motor 120 is shown in Fig. 12. Here it will be noted that control switch 131 is in series with normally closed limit switch 141 in one leg of the circuit while control switch 132 is in series with normally closed limit switch 142 in the opposite leg of the circuit.

With the mechanical structure of the detector, amplifying linkage, and servo mechanism in mind, the operation may be readily understood by reviewing a typical operating cycle as set forth in Figs. 6–11 inclusive. A greatly enlarged section of the blade within its kerf corresponding to each of these figures is set forth in Figs. 6a–11a inclusive. It will be assumed that the work is clamped on the worktable within the jaws provided and that the desired normal line of cut is indicated by the dot-dash line 36. The center of rotation of the blade guides will be assumed to lie along a vertical line in the region of the saw teeth, the position of such line being indicated at 36 in each of the figures.

In the condition shown in Figs. 6, 6a, the automatic control mechanism is centered and the blade is centered along the desired line of cut. Next, to start the cycle, it will be assumed that the blade is caused to depart from its centered position to the position shown in Fig. 7a where it will be noted that the blade is below the line 36 and slightly twisted. This lateral departure causes corresponding movement of the head 70, which, amplified through the levers 80, 95, closes the switch 131. Since the limit switch 141 in series therewith is closed, the motor will be energized to move the corrector arms into the angular position shown in Fig. 7. Since, for ready understanding, it has been assumed that the blade has departed from its initial position by a substantial amount, the racks 105, 106 are transported almost to the limit of movement. The resulting movement of the arm 90 causes the switch lever 95 to be carried bodily away from the switch 131 thereby turning off the motor. As shown in Figs. 8 and 8a, the angular movement of the arm 90 and the arm 100 which operates in step with it, results in twisting of the blade guides so that the blade is turned through a small angle in a direction toward the line of cut 36, the angling of the blade being indicated in exaggerated form in Fig. 8a. The corrective twisting does not, however, react directly upon the position of the head 70 since, as stated, the line of contact between the detector and blade substantially coincides with the center about which the twisting takes place.

Since the blade continues to cut and feed forwardly during this corrective operation, the degree of departure becomes progressively less as shown in Figs. 9 and 9a. Note that in Fig. 9a the blade has moved more nearly into alinement with the theoretical line of cut 36. This restoring movement of the blade causes the corrector head to move in the restoring direction, thereby causing switch 132 to be energized so that the motor is turned on tending to move the arms 90, 100 to a more centered position. This movement continues until the condition shown in Fig. 10 is achieved. Here it will be noted that bodily movement of the switch arm 95, which is mounted on the corrector arm 90, moves the arm 95 away from the switch 132, thus cutting off the motor with restoration about one-half complete.

It may be noted at this point that the angle of corrective twist imparted to the blade is less in the intermediate condition shown in Fig. 10 than it is in the more extreme condition illustrated in Fig. 8. The degree of corrective twisting thus varies in accordance with the amount of departure of the blade from the desired line of cut, being maximum when the departure is maximum and substantially zero when the departure is zero. This proportioned follow-up control achieved by the present mechanism constantly tends to cause the blade to "ease" into its final alined position without objectionable hunting or overswing.

Continued cutting of the blade in the slightly twisted position of Fig. 10 causes the blade to be brought back to a position in which it is precisely alined with the desired line of cut. The additional restoring movement of the blade is accompanied by the final movement of the control head 70 which causes the switch arm 95 to move in a direction toward switch 132 thereby turning the motor on for final centering of the controller arms 90, 100. Centering of the arm 90 is accompanied by bodily movement of the switch arm 95 which turns the motor off with the blade guides and the blade all in the centered condition shown in Fig. 6, completing the correction cycle.

To simplify understanding, it has been assumed that the corrective action has taken place in a series of finite steps with the control head 70 and the arm 90 acting alternately in the control of the motor. However, it will be understood by those skilled in the art that the corrective action may take place in a large number of small steps and that the two control elements may operate more or less simultaneously to accomplish restoration of the blade in a minimum length of time. It will be understood, furthermore, that the reverse operation takes place upon the initial departure of the blade in the opposite direction from that shown in Fig. 7. In a practical case, the device is capable of detecting the slightest tendency of the blade to depart from the desired line of cut, limited only by mechanical play in the system, for thereby avoiding the necessity for any large amounts of correction of the magnitude illustrated in Fig. 7.

Using the present arrangement, it is possible to utilize blades unbalanced due to wear and which would be entirely unsuitable for use in a conventional band saw because of excessive run-off. The control apparatus tends to compensate for ordinary unbalanced wear by maintaining a blade in a slightly twisted position, thereby constantly tending to "crab" the blade back to the desired line of cut. It will be apparent that since there is no possibility, in the present arrangement, of building up a condition of excessive run-off, even in the largest workpieces, this common cause of breakage of band saw blades is eliminated, increasing the safety of the machine operator and effecting an economy in the use of blades.

It is one of the features of the present device that it is ideally suited for use under rough shop conditions and for operation by inexperienced personnel. Aside from the initial setting of the "null" condition, which is achieved by adjusting set screws 84, 85 in the arm 80, no adjustment whatsoever is required and cutting may take place on a production basis without care or attention. As a matter of fact, the band saws employing the present invention may be left unattended for long periods of time with assurance that the blade will be protected against run-off and with assurance that an accurate cut will be produced. Since exactly the same twisting is imparted below the workpiece as above, the same corrective twist will be applied to the blade over the entire length of kerf, thereby insuring that all portions of the workpiece are acted upon uniformly and insuring accuracy in both directions along the plane of the cut, especially important in workpieces of large cross section. Nor is the capacity of the machine reduced by any substantial amount by reason of the detecting head. In practice it will be found that the detecting head may be located within a few inches of the blade guide so that the capacity of the machine is reduced only to this extent.

Where it is desired, for any reason, to immobilize the automatic control mechanism, the motor may be manually operated to restore the racks 105, 106 to their centered positions on the pinion 107. Following this, the source of electrical energy may be disconnected so that the guide blocks will, thereafter, tend to remain fixed in their centered positions. There is sufficient friction in the reduction gearing and sufficient leverage in the arms 90, 100 so that there will be no possibility of driving the pinion 107 and the connected motor by power flowing reversely through the system.

While the steering system described above may be conveniently built into the band saw as a factory operation, the present design is also suited for use as an attachment on existing machines and using existing guide block mountings, provided that such mountings are arranged to twist the blade about its teeth as a center.

The term "band saw" as employed in the claims is not necessarily limited to a machine employing a continuous loop of saw blade, but is also applicable to elongated, double-ended blades which pass through the work either unidirectionally or with reciprocating movement, provided only that provision is made for twisting the blade relative to the workpiece in response to departures from the desired line of cut. Nor is the present invention limited to saws for cutting metal since the same problems exist in saws for cutting wood or other material and may be just as readily solved by using the present technique.

I claim as my invention:

1. In a band saw having a blade and two sets of blade guides spaced respectively on opposite sides of the workpiece, an automatic control device comprising, in combination, a detector member having means for engaging opposite sides of the blade in a narrow region just behind the teeth, means for mounting the detector member closely adjacent the workpiece for movemen in accordance with the lateral displacement of the blade teeth from a desired reference position and independent of the angle of the blade, said blade guides being mounted for limited rotative adjusting movement about an axis generally coinciding with the blade teeth, and means including a servo and responsive to lateral displacement of the detector member from a reference position for simultaneously rotating the blade guides to direct the blade correctively back toward its reference position, said detector member and responsive means being so arranged that the amount of angular movement of the blade guides is proportioned to the lateral departure of the detector member from its reference position.

2. In a band saw having a blade and a worktable together with means for moving the blade endwise while simultaneously advancing it into the workpiece, the combination comprising means for detecting lateral departure of the blade teeth from a desired reference position relative to the worktable, said detecting means being coupled to a narrow strip of blade in the region of the teeth and independent of the remainder of the blade body so as to be substantially unaffected by twisting of the blade, and means responsive to the detecting means and including a servo for correctively twisting the blade in the kerf of the workpiece in a direction tending to restore the teeth to said reference position.

3. In a band saw, the combination comprising means coupled to only a narrow strip of the blade just behind the teeth thereof for detecting lateral departure of the teeth from the desired line of cut, and servo means responsive to the detecting means for correctively twisting the blade in the workpiece to direct the blade back toward said line of cut.

4. In a band saw having a blade and two sets of blade guides spaced respectively on opposite sides of the workpiece, an automatic control device comprising, in combination, a detector member having means for engaging the blade in a narrow region just behind the teeth and free of contact with the remainder of the blade body so as to be substantially unaffected by the twisting of the blade, means for mounting the detector member closely adjacent the workpiece for movement in accordance with the lateral displacement of the blade teeth from a desired reference position, said blade guides being mounted for limited rotative adjusting movement about an axis generally coinciding with the blade teeth, and means including a servo and responsive to lateral displacement of the detector member from a reference position for simultaneously rotating the blade guides to direct the blade correctively back toward its reference position.

5. In a band saw having a blade and two sets of blade guides spaced respectively on opposite sides of the workpiece, an automatic control device comprising, in combination, a detector member having means for snugly engaging the blade in a narrow region just behind the teeth, means for mounting the detector member closely adjacent the workpiece for producing an output in accordance with the lateral displacement of the blade teeth from a desired reference position, said blade guides being mounted for limited rotative adjusting movement about an axis generally coinciding with the blade teeth, a servo mechanism for simultaneously rotating the blade guides to direct the blade back toward its reference position, control means responsive to the output of the detector as well as the angular position of the blade guides for energizing said servo to produce corrective twisting of the blade by an amount which varies with the lateral departure of the detector member from its reference position.

6. In a band saw having a blade and two sets of blade guides spaced respectively on opposite sides of the workpiece, an automatic control device comprising, in combination, a detector member having means for snugly engaging the blade in a narrow region just behind the teeth, means for mounting the detector member closely adjacent the workpiece for movement in accordance with the lateral displacement of the blade teeth from a desired reference position, said blade guides being mounted for limited rotative adjusting movement about an axis generally coinciding with the blade teeth, means including a servo and responsive to lateral displacement of the detector member from a reference position for simultaneously rotating the blade guides to steer the blade correctively back toward its reference position, said detector member and responsive means being so arranged that the amount of angular movement of the blade guides is proportioned to the lateral departure of the detector member from its reference position, and means for limiting the maximum rotation of the blade guides to an angle on the order of plus or minus two degrees.

7. In a band saw, the combination comprising pairs of spaced blade guides located on opposite sides of a workpiece for guiding the blade therethrough, means for pivotally mounting the blade guides about a common axis generally coinciding with the teeth on said blade, a detector coupled to said blade in a narrow region just behind said teeth for movement in accordance with the lateral positioning of the blade as it progresses through the workpiece, and a servo mechanism responsive to the position of said detector member for rocking said blade guides in unison to effect corrective steering of the blade back to the desired line of cut, said detector member being mounted on one of said blade guides and spaced therefrom in a position adjacent the workpiece.

8. In a band saw, the combination comprising pairs of spaced blade guides located on opposite sides of a workpiece for guiding the blade therethrough, a pair of corrector arms coupled to said blade guides and extending rearwardly therefrom, means for pivotally mounting the blade guides about a common axis generally coinciding with the teeth on said blade, a detector member located between said blade guides and coupled to said blade in a narrow region closely adjacent said teeth for movement in accordance with the lateral positioning of the blade as it progresses through the workpiece, and a servo mechanism responsive to the position of said detector member for rocking said arms in unison to effect corrective steering of the blade back to the desired line of cut, said servo means being so constructed and arranged that the degree of movement of the corrector arms is proportioned to the lateral displacement of the detector member.

9. In a band saw, the combination comprising pairs of spaced blade guides located on opposite sides of a workpiece for guiding the blade therethrough, at least one of said guides being adjustable toward and away from the other, a pair of corrector arms coupled to said blade guides and extending rearwardly therefrom, means for pivotally mounting the blade guides about a common axis generally coinciding with the teeth on said blade, a detector member located between said blade guides and coupled to said blade in the region of said teeth for movement in accordance with the lateral positioning of the blade as it progresses through the workpiece, racks on the ends of said corrector arms, an elongated pinion for engaging said racks, said pinion extending parallel to the blade so that contact is maintained between the racks and the pinion for all positions of spacing adjustment of said guides, and a servo mechanism responsive to the position of said detector member for turning said pinion and thus rocking said arms in unison to effect corrective steering of the blade back to the desired line of cut.

10. In a band saw, the combination comprising pairs of spaced blade guides located on opposite sides of a workpiece for guiding the blade therethrough, a corrector arm rigidly coupled to said blade guide and extending rearwardly therefrom, means for pivotally mounting the blade guide about an axis generally coinciding with the teeth on said blade, a detector member coupled to said blade in a narrow region closely adjacent said teeth and pivoted to said blade guide for movement in accordance with the lateral positioning of the blade as it progresses through the workpiece, forward and reverse electric switches stationarily mounted with respect to the workpiece, a switch arm bodily mounted on said corrector arm and coupled to said detector member for operating said switches upon departure of either the detector member or the arm from a centered reference position, and a servo mechanism including a reversible motor connected to said switches for rocking said arm to effect corrective steering of the blade back to the desired line of cut.

References Cited in the file of this patent

UNITED STATES PATENTS

| | | |
|---|---|---|
| 1,086,074 | Newell et al. | Feb. 3, 1914 |
| 1,374,600 | Newell | Apr. 12, 1921 |
| 2,397,108 | Hanna et al. | Mar. 26, 1946 |
| 2,498,223 | Rommel | Feb. 21, 1950 |
| 2,670,767 | Miller | Mar. 2, 1954 |
| 2,724,492 | Kolbe | Nov. 22, 1955 |
| 2,785,715 | Brundell et al. | Mar. 19, 1957 |

FOREIGN PATENTS

| | | |
|---|---|---|
| 24,700 | Germany | Dec. 13, 1883 |
| 608,767 | Great Britain | Sept. 21, 1948 |